Figure 1:
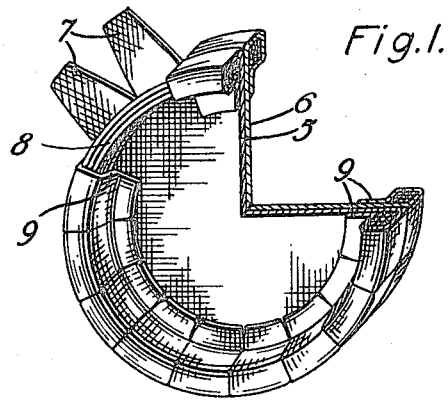

G. E. MATHER.
DIAPHRAGM.
APPLICATION FILED JUNE 24, 1919.

1,386,722.

Patented Aug. 9, 1921.

Inventor:
George E. Mather
by J. E. Roberts  Att'y.

UNITED STATES PATENT OFFICE.

GEORGE E. MATHER, OF EAST ORANGE, NEW JERSEY, ASSIGNOR TO WESTERN ELECTRIC COMPANY, INCORPORATED, OF NEW YORK, N. Y., A CORPORATION OF NEW YORK.

DIAPHRAGM.

1,386,722.  Specification of Letters Patent.  Patented Aug. 9, 1921.

Application filed June 24, 1919. Serial No. 306,357.

*To all whom it may concern:*

Be it known that I, GEORGE E. MATHER, a citizen of the United States, residing at East Orange, in the county of Essex, State of New Jersey, have invented certain new and useful Improvements in Diaphragms, of which the following is a full, clear, concise, and exact description.

This invention relates in general to diaphragms and more particularly to a method for constructing a diaphragm especially suitable for use under water and at depths involving considerable pressure on the diaphragm.

In the detecting apparatus used in connection with submarine signaling and also in similar apparatus used for detecting the faint sounds given off by the propellers of submarine vessels, it is often essential that the apparatus be mounted at a considerable distance below the surface of the water, in which case the apparatus must of necessity be arranged to withstand the hydrostatic pressure exerted at the depth where it is to be used or else means must be provided to compensate for such pressure. Even when compensating means are provided, it is necessary to provide against slight changes in pressure due to sudden changes in depth. In the type of apparatus commonly used for this work, the detecting device consists of a substantially rigid casing equipped with one or more flexible diaphragms which serve as side walls and are responsive to vibrations in the surrounding medium. The casing itself is very easily made sufficiently strong to withstand the hydrostatic pressures exerted, but the diaphragm must be made to withstand such pressure and at the same time retain its flexible character. Moreover, the diaphragm must be so made as to permit its being clamped to the casing in such a way as to provide a water-tight seal to prevent the entrance of water in the interior of the casing and the resulting damage to the delicate apparatus mounted therein. To withstand satisfactorily the pressures met with, and at the same time to insure a water-tight seal, it has been the practice to provide a soft rubber diaphragm equipped with a fabric insert to give it the necessary strength and having at its periphery a clamping ring which permits it being securely clamped in place. Much difficulty, however, has been experienced in obtaining such a diaphragm in which the mechanical structure is uniform and in which there is no tendency for the diaphragm to leak after being placed in service.

It is therefore the object of the present invention to provide a method of making a flexible diaphragm which will be capable of withstanding considerable pressure and which, as a result of its uniform mechanical structure, can be clamped in position to provide a water-tight seal.

To attain this object and in accordance with a feature of this invention, there is provided a method of constructing a diaphragm wherein the insert portion or reinforcing member is first molded into its final form, then placed between the two halves of an outer casing and the complete structure placed in a suitable mold and vulcanized into its final shape.

Figure 2:
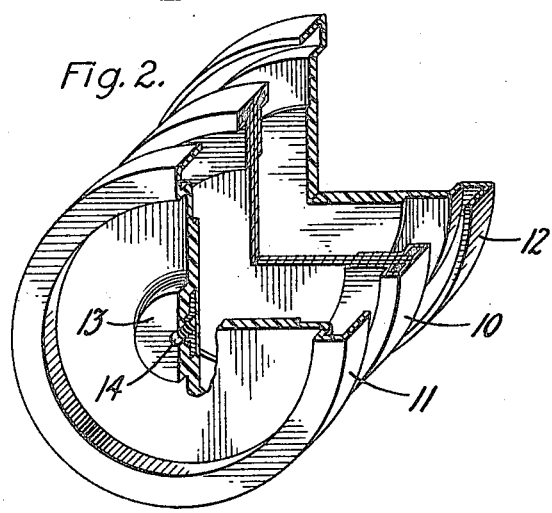
Figure 3:
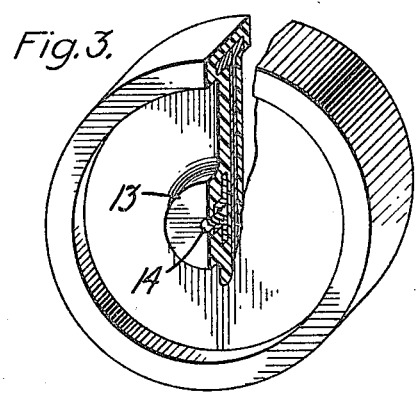

This and other features of the invention will be more clearly understood by reference to the accompanying drawing in which Figure 1 is a perspective view, partially in section, of the insert before being molded into shape; Fig. 2 is a view of the insert molded into form and arranged between the two halves of the outer casing in the order in which the parts are to be assembled; and Fig. 3 is a perspective view partially in section of a completed diaphragm.

Referring now to the drawing, a sheet of fabric material, such as heavy canvas, is first treated with a rubber compound, during which process it is run between heavy rollers in order to force the rubber compound into all of the interstices of the fabric. From this sheet disks 5 and 6 having at their peripheries a series of projections or tabs 7—7, are then cut or punched. A ring 8 preferably formed of twine or equally compressible material is then laid alongside of each disk and the tabs are bent over as shown at 9. Two of the fabric disks equipped with the cord rings are then assembled back to back, as shown in Fig. 1, and placed in a mold where they are pressed into the final shape desired, as shown at 10 of Fig. 2, and partially vulcanized in order that they may retain this shape after being removed from the mold.

The outer casing is made in two portions 11 and 12 which are of rubber molded into the desired form and only partially vulcanized. The fabric insert 10 and the casing portions 11 and 12 are then assembled in the order shown in Fig. 2 and placed into a mold where they are subjected to pressure and to the heat necessary to cause the further vulcanization and to produce a completed diaphragm, as shown in partial cross-section in Fig. 3. The portion 11 of the outer case is provided with a boss 13 in which is molded a metal insert 14 provided with the necessary threads to engage the threaded stem of a microphone or telephone transmitter button which can thus be mounted directly on the diaphragm.

In the completed diaphragm, produced by the method described, the fabric insert is of uniform structure and is symmetrically placed with respect to the covering of soft rubber. Such a diaphragm can therefore be clamped with sufficient pressure to maintain a water-tight seal and without danger of the insert being forced through the rubber covering, which would permit water to reach the fabric insert and destroy the water-tight joint.

What is claimed is:

1. The method of constructing a diaphragm which consists in incasing a reinforcing member between two partially vulcanized members, placing the assembled parts in a mold and subjecting to pressure and heat to cause further vulcanization.

2. The method of constructing a diaphragm which consists in partially vulcanizing a reinforcing insert, incasing said reinforcing insert between two partially vulcanized members, placing the assembled parts in a mold and vulcanizing them into a unitary structure.

3. The method of constructing a diaphragm which consists in forming a reinforcing insert, molding said insert into the desired form and partially vulcanizing, placing the insert in a mold between two partially vulcanized side pieces, and subjecting to pressure and heat to cause further vulcanization.

4. The method of constructing a diaphragm which consists in forming a reinforcing member of fabric material treated with a rubber compound, molding said member into the desired form and partially vulcanizing, assembling said member between the halves of a two-piece casing composed of rubber partially vulcanized, placing the assembled parts in a mold, and applying pressure and heat to vulcanize said parts into a unitary structure of the desired form.

5. The method of constructing a diaphragm which consists in treating a sheet of fabric material with rubber compound, cutting therefrom a pair of disks having a plurality of projections at their peripheries, placing a ring member adjacent to each disk, folding over the projected portions to inclose said ring member, placing two of such disks back to back in a mold, applying pressure and heat to form an insert of the desired form and partially vulcanizing such insert, placing said insert in a mold between two partially vulcanized side pieces, and applying pressure and heat to vulcanize said members into a unitary structure of the desired shape.

6. The method of constructing a diaphragm which consists in making a reinforcing insert of the required shape and two partially vulcanized incasing members one of which has a projection thereon in which is molded a metal insert and assembling said reinforcing insert between said incasing members and vulcanizing said assembled members into a unitary structure.

In witness whereof, I hereunto subscribe my name this 17th day of June, A. D. 1919.

GEORGE E. MATHER.